United States Patent

[11] 3,631,605

[72] Inventors Roger Wylie
Baytown;
Ralph James, Jr., Channelview, Tex.
[21] Appl. No. 61,534
[22] Filed Aug. 6, 1970
[45] Patented Jan. 4, 1972
[73] Assignee Esso Research and Engineering Company

[54] DRYING SOLID POLYMER
24 Claims, 4 Drawing Figs.
[52] U.S. Cl. .................................................. 34/9, 34/17, 34/60
[51] Int. Cl. ........................................................ F26b 3/00
[50] Field of Search ............................................. 34/9, 17, 60

[56] References Cited
UNITED STATES PATENTS
2,443,462 6/1948 Kimberlin, Jr. et al. ...... 34/9
2,460,582 2/1944 Japs .............................. 34/9
2,771,689 11/1956 Bettes, Jr. ..................... 34/17

Primary Examiner—John J. Camby
Attorneys—Timothy L. Burgess, Thomas B. McCulloch, Melvin F. Fincke, John S. Schneider, Sylvester W. Brock, Jr. and Kurt S. Myers ABSTRACT: Solid polymer of an alpha monoolefin having two to eight carbon atoms in the molecule which is wet with a diluent is dried by forming the wet polymer into a slurry with heated aqueous liquid and then drying the polymer by subjecting the slurry to centrifugal force in the dewatering portion of a drying zone to remove substantially all of the aqueous liquid and diluent and then completing the drying operation in the second portion of the drying zone by heating same to a sufficient temperature while continuing to subject the polymer to centrifugal force.

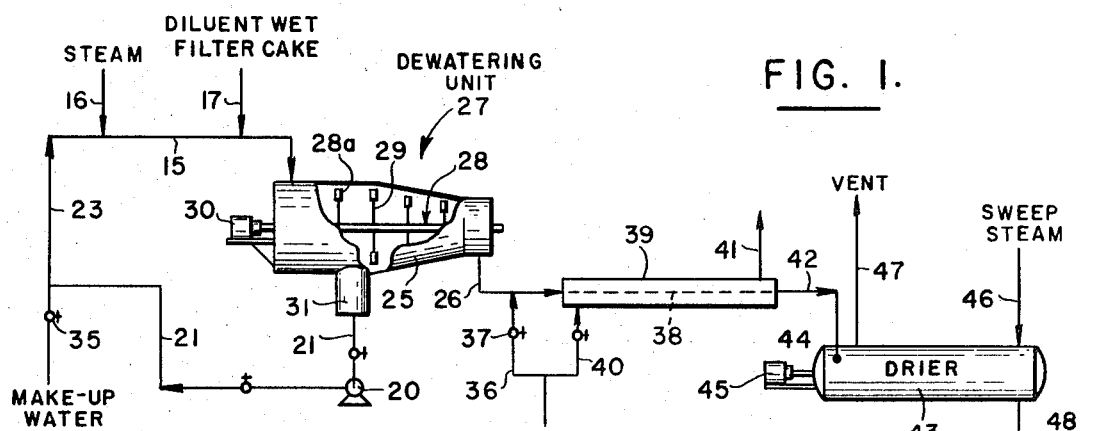
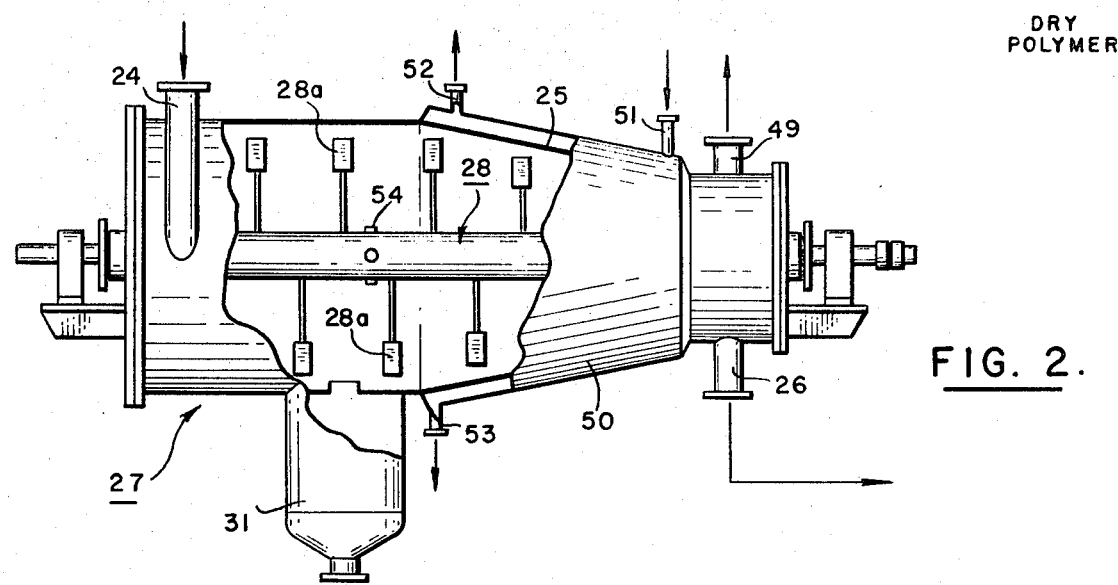
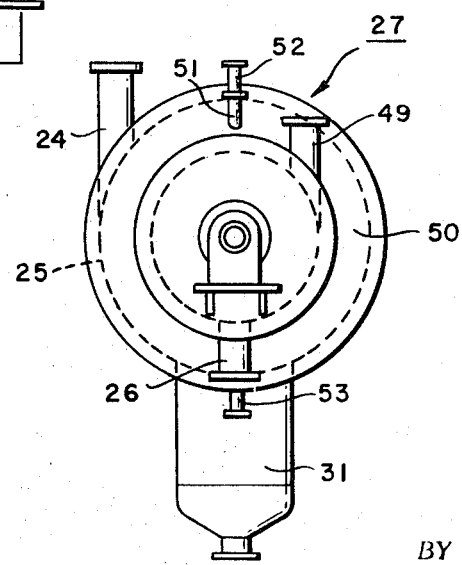

INVENTORS.
ROGER WYLIE,
RALPH JAMES, JR.,
ATTORNEY.

DRYING SOLID POLYMER

BACKGROUND OF THE INVENTION

The present invention is directed to the drying of solid polymer. More particularly, the invention is concerned with drying a solid polymer of an alpha monoolefin having two to eight carbon atoms in the molecule which is wet with a diluent such as a hydrocarbon. In its more specific aspects, the invention is concerned with drying solid polymer by admixing a diluent-wet polymer with an aqueous liquid and subjecting same to treatment wherein the aqueous liquid is removed and the polymer heated under centrifugal conditions.

The Prior Art

It has been known heretofore to dry solid polymer of an alpha olefin by heating same in the presence or absence of aqueous liquid such as water and certain aqueous solutions. It has also been known to remove diluent from such solid polymers with vibrating screens and rotating drying equipment. However, it has not been known heretofore that the diluent wet polymer may be dried by forming it into an aqueous slurry which is dewatered under centrifugal conditions and the dewatered polymer subjected to centrifugal force while heating same. The present invention is advantageous and useful in that by employing an aqueous slurry of the polymer and applying centrifugal force in a dewatering step and a drying step it is possible to reduce the amount of heat required to dry the polymer. For example, in accordance with the present invention, the amount of steam has been reduced to about one-third of that required heretofore.

SUMMARY OF THE INVENTION

The present invention may be briefly described and summarized as involving a method for drying a polymer of an alpha olefin having two to eight carbon atoms in the molecule which is wet with a diluent such as a hydrocarbon diluent in which the diluent-wet polymer is heated with a heated aqueous liquid such as water to form a slurry. The polymer in the form of a slurry is dried by subjecting the slurry to centrifugal force in a first portion of a drying zone to remove substantially all of the aqueous liquid ad diluent, following which the drying operation is completed in a second portion of the drying zone by heating the polymer to a sufficient temperature while continuing to subject same to centrifugal force, the aqueous liquid being drawn off from the drying zone prior to the heating step. The invention may also be briefly described and summarized as involving apparatus for drying solid polymer which comprises means for forming an aqueous slurry of the diluent-wet polymer, means for dewatering the polymer in the aqueous slurry, the dewatering means comprising centrifugal means having separate inlet and outlet means, and means for removing aqueous liquid. Means are provided for heating the dewatered polymer, said heating means comprising centrifugal means and heating means. The apparatus also includes means for recovering dried polymer from the heating means.

VARIABLES OF THE INVENTION

The alpha monoolefin employed to form the solid polymer may be any one of a number of alpha monoolefin having two to eight carbon atoms in the molecule. For example, the alpha monoolefin may be ethylene, propylene, butylene, pentylene, hexylene, heptene or octene. Preferably, the alpha monoolefin will be ethylene or propylene. Mixtures of two or more alpha monoolefins may be employed to form copolymers which may be dried in accordance with the present invention.

The polymer which may be dried according to the present invention may be any polymer of an alpha monoolefin which has been described heretofore, but preferably is a Ziegler polymer or a polymer which is produced by high-pressure polymerization of ethylene and the like. It is to be emphasized that a solid polymer produced by any type of catalyst is susceptible to drying in accordance with the present invention.

The diluent which wets the solid polymer and which must be removed may be present in an amount within the range of about 20 to about 100 percent by weight, preferably within the range of about 30 percent to about 70 percent by weight, and usually is a nonaqueous diluent such as a hydrocarbon diluent which may be an aromatic hydrocarbon as exemplified by xylene, a paraffin hydrocarbon as exemplified by propane, butane, pentane, heptane, and the like, or a naphthenic hydrocarbon such as cyclopentane, cyclohexane and higher members of the same homologous series. Mixtures of the aromatic, paraffinic or naphthenic hydrocarbons may be used. As a general rule such hydrocarbon fractions boiling from about —44° up to about 700° F. may be employed.

The diluent which wets the polymer is the residual diluent which remains associated with the polymer after the polymer has been filtered or otherwise separated from the diluent, usually in a filtration zone such as a rotary filter.

The residual diluent may contain an aliphatic alcohol such as methanol, ethanol, propanol, butanol and the like which may be added to the polymer after formation to destroy residual catalyst.

The aqueous liquid ordinarily is water which may be heated with steam and is usually at a temperature within the range from about 150° to about 220° F. About 30 to about 500 percent by weight of water based on the diluent-wet polymer may be used.

In drying the polymer, it may be subjected to centrifugal force within the range from about 2 to about 100 times gravity. A centrifugal force of about 3–20 times gravity gives satisfactory results.

The dewatering and drying operations are conducted at a temperature between about 150° and 300° F. Preferably, the dewatering step is conducted at a temperature within the range of about 180° to about 210° F. while the drying step is conducted at a temperature within the range of about 200° to about 220° F.

BRIEF REFERENCE TO THE DRAWINGS

The present invention will be further described and illustrated by the drawings illustrated preferred modes and embodiments in which:

FIG. 1 is a flow diagram in partial section of one mode of practicing the invention;

FIG. 2 is a partial sectional view of the dewatering device of FIG. 1;

FIG. 3 is an end view of FIG. 2; and

Figure 4:
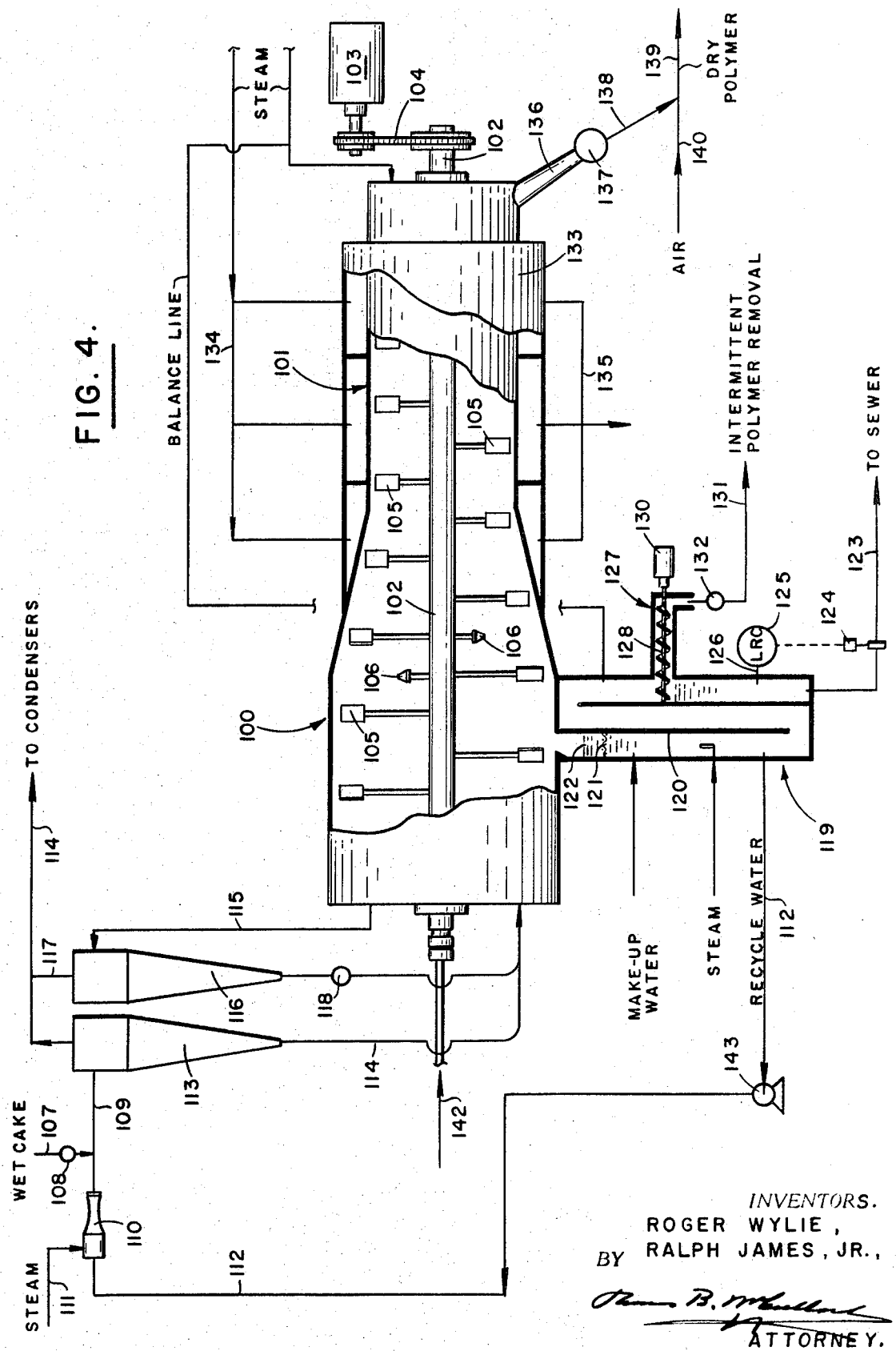
FIG. 4 illustrates another embodiment of the present invention.

DESCRIPTION OF THE PREFERRED MODES AND EMBODIMENTS WITH REFERENCE TO THE DRAWINGS

Referring now to the drawings and particularly to FIGS. 1–3, leading into dewatering means 27 and discharging thereinto is line 15 to which lines 16 and 17 connect. Line 16 is provided for introduction of steam from a source not shown, and line 17 serves to introduce diluent wet filler cake from a rotary filter from line 15.

The steam heats the water in line 15, which is introduced from a source which will be described further, to a temperature from about 200° to about 250° F., preferably about 220° F., and the resulting slurry of polymer in water is introduced into dewatering means 27 which is roughly in the form of a truncated cone and the polymer outlet 26 being at the truncated apex of the cone.

Extending into the dewatering means 27 is coaxial shaft paddling means 28 provided with a plurality of paddles 28a extending by means 29 from the means 28. The means 28 is driven by a prime mover 30 which extends to the exterior of the means 27 through a stuffing box not shown.

A leg 31 depends from the means 27 and allows water which is thrown against the interior wall by the centrifugal force of the means 27 to be collected and withdrawn by line 21 recycled in part by line 21 provided with pump 20 through line 23 to line 15. Makeup water may be introduced by openings valve 35 in line 23 connected to a source of water not shown.

The polymer in means 27 with a substantial amount of water removed is forced up the cone 25 of means 27 and withdrawn by line 26 where additional steam may be introduced if needed by line 36 controlled by valve 37 and the polymer routed through a jacketed transfer line 38 surrounded by jacket 39 through which steam circulates through lines 40 and 41. The heated and partially dried polymer discharges from transfer line 38 and line 42 into a drier 43 which is similarly equipped as dewatering means 25 with respect to the rotating paddle means 28. In this particular instance, the paddle means (not shown) are driven by a shaft 44 connected to a prime mover 45, the shaft extending into the drier 43. Sweep steam or inert gas are introduced into rotating drier 43 by line 46 and gases or vapors or withdrawn by line 47. The dry polymer is discharged by line 48.

Referring now to FIGS. 2 and 3 where identical numerals identify identical parts, the inlet 24 provides for introduction of a polymer slurry while the outlet 49 allows the withdrawal of vapors from the dewatering means 27, the polymer being discharged by line 26 as has been described, with the water being accumulated in the leg 31. It will be noted that the paddle means 28 is provided with paddles 28a which may be arranged on 6-inch centers spaced along the means 28. Not shown in FIG. 1 is a jacket 50 surrounding the conical portion 25 of the dewatering means 27 into which steam is introduced by inlet 51 and removed by vent 52. Any condensate may be discharged by outlet 53.

It is to be noted that the means 28 may be provided with a plurality of taps into which spray nozzles 54 may be introduced. These spray nozzles may be located about mid point of the paddle means 28 and may be used for introduction of wash liquid or a neutralizing medium.

Referring now to FIG. 4, the dewatering means 27 and the drying means 43 of FIGS. 1–3 are combined into one vessel. Referring specifically to FIG. 4, numeral 100 designates the dewatering means and numeral 100 designates the drying means. A coaxial shaft 102 is powered by prime mover 103 through a chain or belt drive 104. Arranged along the shaft 102 is a plurality of paddle means 105 which extend the length of the means 100 and 101. Suitable spray nozzles 106 are also included for injecting of liquid such as wash liquid or neutralizing medium into the means 100.

The diluent wet filler cake from a rotary filter is introduced by line 107 through a star feeder 108 into line 109 which contains a steam injector 110 into which steam is fed by line 111 with water being introduced thereto by line 112.

The mixture of polymer and heated water is discharged into a separator 113 from which condensable vapors are discharged by line 114 and the slurry of water is discharged by line 114 into the dewatering means 100. A vent line 115 is provided by way of which polymers and vapors are introduced into a separator 116 which discharges condensables by line 117 into line 114 and through star feeder 118 slurry which had escaped by line 115 back into line 114.

The shaft 102 rotates the paddles 105 such that the water is thrown against the exterior inner wall of the dewatering means 100 and is discharged into well 119 provided with a baffle 120. A stilling wire mesh 121 is located just below the polymer water interface 122 in well 119. The water flows downwardly and then upwardly around the baffle 120, then downwardly to be discharged by line 123 controlled by valve 24 which is controlled by liquid level recorder controller 125 connected by line 126 to well 119. Polymer may be removed from well 119 through intermittent polymer removal means 127 involving a screw 128 driven by prime mover 130 which allows the polymer in well 119 to be discharged by line 131 and valve 132.

It will be noted that the drying means 101 is provided with a jacket 133 into which there is manifolded by manifold 134 steam for heating the jacket 133. This steam may be discharged by manifold 135 as steam or condensate. In the present invention, with respect to FIG. 4, the dry polymer discharges through outlet 136 and star feeder 137 into line 138 where it is introduced into a transfer line 139 and transported by air introduced into line 140 to suitable powder bins.

It is to be noted that sweep steam or other inert gas may be introduced countercurrent to polymer flow through line 141 with the vapors being suitably vented by line 115.

Condensate and neutralizers may be introduced by line 142 into the hollow shaft 102 and sprayed through sprays 106 into the polymer as it is thrown against the wall of the dewatering and drying means by the paddle means 105.

It is to be noted that recycle water is withdrawn from the well 119 by line 112 and pumped by pump 143 to the steam injector 110.

As pointed out before and as reiterated here, the present invention is quite advantageous and useful in that the steam requirements are about one-third of that required heretofore. Other advantages inure to the present invention in that the process is simplified and equipment and operations heretofore employed are no longer necessary.

It is to be noted in the practice of the present invention that the dewatering and drying means may be in separate vessels or combined in one vessel. Where larger operations are contemplated, the embodiments of FIGS. 1–3 may be preferred, whereas, in smaller operations the embodiments of FIG. 4 may be more desirable.

The present invention has been employed successfully in dewatering an aqueous slurry of polypropylene. In one example, a slurry containing 1–5 percent by weight of polypropylene was dewatered to the extent that polymer containing about 9 weight percent of water was obtained when no steam was supplied to concentric jacket. This amount of water may be removed by centrifugal operations while heating the polymer in accordance with the present invention. A comparison of dewatering operations with other dewatering devices is presented below:

| Type of Dewater | Wt. % Vol. |
| --- | --- |
| 1. Dewaterer (without heat) | 9 |
| 2. Dewaterer (with jacket heat) | 0.4–1.1 |
| 3. Vibrating Screen | 20–25 |
| 4. Bucket Conveyor | 30 |
| 5. Incline Beach | 20–25 |
| 6. Screen Bowl Centrifuge (1000–3000 g.) | 10 |

It will be seen that dewatering in accordance with the present invention allows the obtaining of unobvious results which are quite advantageous and useful over other dewatering operations.

The nature and objects of the present invention having been fully described and illustrated and the best modes and embodiments contemplated having been set forth, what we wish to claim as new and useful and secure by Letters Patent is:

1. A method for drying a solid polymer of an alpha monoolefin having two to eight carbon atoms in the molecule wet with a nonaqueous diluent which comprises:
    admixing said diluent-wet polymer with a heated aqueous liquid to form a slurry in said aqueous liquid;
    drying said polymer by first subjecting said slurry to centrifugal force in a first portion of a drying zone to remove substantially all of said aqueous liquid and diluent; and
    then completing said drying operation is a second portion of said drying zone by heating said polymer to a sufficient temperature while subjecting same to centrifugal force;
    aqueous liquid being drawn off from said drying zone ahead of the heating step.

2. A method in accordance with claim 1 in which the solid polymer is dried at a temperature between about 150° to about 300° F. during said drying steps.

3. A method in accordance with claim 1 in which the solid polymer is subjected to a centrifugal force of about 2 to about 100 times gravity.

4. A method in accordance with claim 1 in which the polymer is subjected to countercurrent flow of heated inert gas at least during said heating steps.

5. A method in accordance with claim 1 in which the solid polymer is wet with about 30 percent to about 70 percent by weight of diluent.

6. A method in accordance with claim 1 in which the diluent is xylene.

7. A method in accordance with claim 5 in which the diluent contains an aliphatic alcohol.

8. A method in accordance with claim 1 in which the polymer is contacted with a neutralizing agent intermediate the drying steps.

9. A method in accordance with claim 1 in which the slurry is admixed with a neutralizing agent.

10. A method in accordance with claim 1 in which the alpha monoolefin is propylene.

11. A method in accordance with claim 1 in which:
  1. the solid polymer is dried at a temperature between about 225° and about 200° F.;
  2. the solid polymer is subjected to countercurrent flow of heated inert gas at least during said heating step;
  3. the diluent is xylene; and
  4. the polymer is contacted with a neutralizing agent.

12. A method in accordance with claim 11 in which the xylene contains an aliphatic alcohol.

13. A method in accordance with claim 10 in which the solid polymer is subjected to a centrifugal force of about 2 to about 100 times gravity.

14. Apparatus for drying solid polymer of an alpha monoolefin which is wet with a nonaqueous diluent which comprises:
  means for forming an aqueous slurry of said diluent-wet polymer;
  means for dewatering the polymer in said aqueous slurry, said dewatering means comprising centrifugal means having separate inlet and outlet means and means for removing aqueous liquid;
  means for heating the dewatered polymer, said heating means comprising centrifugal means and external heating means; and
  means for recovering dried polymer from said heating means.

15. Apparatus in accordance with claim 14 in which the dewatering means and the heating means are integral.

16. Apparatus in accordance with claim 14 in which a transfer means is provided between the dewatering means and heating means for transferring dewatered polymer.

17. Apparatus in accordance with claim 14 in which the heating means is provided with a steam jacket.

18. Apparatus in accordance with claim 14 in which the dewatering means is in the form of a truncated cone with the inlet at the base of the cone and the outlet at the truncated apex.

19. Apparatus in accordance with claim 14 in which the centrifugal means comprises coaxial shaft driven paddle means.

20. Apparatus in accordance with claim 14 in which the centrifugal means are integral.

21. Apparatus in accordance with claim 16 in which the transfer means is provided with heating means.

22. Apparatus in accordance with claim 14 in which:
  a. the heating means is provided with a steam jacket;
  b. the dewatering means is in the form of a truncated cone with the inlet at the base of the cone and the outlet at the truncated apex; and
  c. the centrifugal means comprise coaxial shaft driver paddle means.

23. Apparatus in accordance with claim 22 in which the centrifugal means are integral.

24. Apparatus in accordance with claim 22 in which the coaxial shaft driven paddle means is provided with spray means for injecting liquid in the direction of the paddle means.

* * * * *